United States Patent
Lida et al.

(10) Patent No.: US 9,722,763 B2
(45) Date of Patent: Aug. 1, 2017

(54) HIGHLY UTILIZED COMMUNICATION CHANNEL WITH ORDER AND RETRANSMISSIONS

(75) Inventors: Eyran Lida, Kfar Ha-Oranim (IL); Nadav Banet, Kadima (IL)

(73) Assignee: Valens Semiconductor Ltd., Hod Hasharon (IL)

( * ) Notice: Subject to any disclaimer, the term of this patent is extended or adjusted under 35 U.S.C. 154(b) by 629 days.

(21) Appl. No.: 12/689,359

(22) Filed: Jan. 19, 2010

(65) Prior Publication Data

US 2010/0122135 A1 May 13, 2010

Related U.S. Application Data (63) Continuation-in-part of application No. 11/703,080, filed on Feb. 7, 2007.

(51) Int. Cl.
| H04L 5/14 | (2006.01) |
| H04L 1/00 | (2006.01) |
| H04L 1/18 | (2006.01) |
| H04L 25/49 | (2006.01) |
| H04L 27/00 | (2006.01) |

(52) U.S. Cl.
CPC ............ *H04L 5/143* (2013.01); *H04L 1/007* (2013.01); *H04L 1/1819* (2013.01); *H04L 1/1841* (2013.01); *H04L 25/4919* (2013.01); *H04L 27/0008* (2013.01); *H04L 1/1887* (2013.01)

(58) Field of Classification Search
CPC ....... H04L 5/143; H04L 1/007; H04L 1/1819; H04L 1/1841; H04L 27/0008; H04L 25/4919; H04L 1/1887

USPC ....... 714/748, 749, 751, 752, 786, 821, 712; 370/217, 218, 222, 241, 242, 244, 250; 375/224, 225

See application file for complete search history.

(56) References Cited

U.S. PATENT DOCUMENTS

| 5,768,527 | A   |    | 6/1998  | Zhu |         |
|-----------|-----|----|---------|-----|---------|
| 6,031,818 | A   | *  | 2/2000  | Lo et al. | 370/216 |
| 6,373,842 | B1  |    | 4/2002  | Coverdale |   |
| 6,490,243 | B1  | *  | 12/2002 | Tanaka et al. | 370/216 |
| 6,850,519 | B1  | *  | 2/2005  | Saito et al. | 370/389 |

(Continued)

FOREIGN PATENT DOCUMENTS

| DE | EP 2001257 A1 * | 12/2008 | ............. H04L 12/56 |
| JP | WO 2007111295 A1 * | 10/2007 | ............. H04L 12/56 |

OTHER PUBLICATIONS

Jong-Suk Ahn et al., An Adaptive FEC Algorithm for Mobile Wireless Networks, Mar. 25, 2002, USC/ISI, pp. 1-10.*

(Continued)

*Primary Examiner* — John J Tabone, Jr.
(74) *Attorney, Agent, or Firm* — Active Knowledge Ltd.

(57) ABSTRACT

A communication link comprising: a first transceiver configured to transmit a first set of packets at a predetermined rate with a first error resistance level, store the transmitted data in a buffer, receive a retransmission request, and retransmit the relevant data using one or more packets encoded with a second error resistance level that is higher than the first error resistance level. And a second transceiver configured to receive the first set of packets, detect an erroneous packet, request retransmission of the erroneous packet, and forward the data received in the packets according to its original order approximately after a fixed delay.

29 Claims, 8 Drawing Sheets

(56) References Cited

U.S. PATENT DOCUMENTS

| | | | |
|---|---|---|---|
| 7,031,249 B2* | 4/2006 | Kowalski | 370/203 |
| 7,539,187 B2* | 5/2009 | Fellman et al. | 370/389 |
| 7,636,298 B2* | 12/2009 | Miura et al. | 370/216 |
| 7,734,987 B2* | 6/2010 | Kaburaki et al. | 714/774 |
| 7,869,463 B2* | 1/2011 | Shiizaki et al. | 370/498 |
| 8,050,203 B2* | 11/2011 | Jacobsen et al. | 370/310 |
| 8,112,687 B2* | 2/2012 | Pons et al. | 714/748 |
| 8,135,015 B2* | 3/2012 | Rajkotia et al. | 370/392 |
| 8,171,366 B2* | 5/2012 | Suga | 714/748 |
| 8,276,026 B2* | 9/2012 | Jitsukawa et al. | 714/708 |
| 8,356,224 B2* | 1/2013 | Kaburaki et al. | 714/748 |
| 2002/0027897 A1 | 3/2002 | Moulsley | |
| 2003/0097629 A1* | 5/2003 | Moon et al. | 714/751 |
| 2005/0094667 A1* | 5/2005 | Dahlman et al. | 370/473 |
| 2005/0147053 A1* | 7/2005 | Saito et al. | 370/252 |
| 2006/0077919 A1* | 4/2006 | Gerkis | 370/315 |
| 2006/0104279 A1* | 5/2006 | Fellman et al. | 370/392 |
| 2006/0268871 A1* | 11/2006 | Van Zijst | 370/390 |
| 2007/0204294 A1* | 8/2007 | Walker et al. | 725/38 |
| 2007/0234170 A1* | 10/2007 | Shao et al. | 714/746 |
| 2008/0031177 A1* | 2/2008 | Lee et al. | 370/312 |
| 2008/0187028 A1* | 8/2008 | Lida | 375/140 |
| 2008/0260067 A1 | 10/2008 | Wengerter | |
| 2009/0034488 A1 | 2/2009 | Takagi | |
| 2009/0307554 A1* | 12/2009 | Marinier et al. | 714/748 |
| 2010/0195764 A1* | 8/2010 | Murakami | 375/296 |
| 2010/0313095 A1* | 12/2010 | Dinan | 714/749 |
| 2010/0322136 A1* | 12/2010 | Kanazawa et al. | 370/312 |
| 2011/0078530 A1* | 3/2011 | Shiizaki et al. | 714/749 |
| 2012/0170445 A1* | 7/2012 | Perumanam et al. | 370/216 |

OTHER PUBLICATIONS

Liu, Cross-Layer Scheduling With Prescribed QoS Guarantees in Adaptive Wireless Networks, IEEE Journal on Selected Areas in Communications, vol. 23, No. 5, May 2005.

Liu, Cross-Layer Combining of Adaptive Modulation and Coding With Truncated ARQ Over Wireless Links, IEEE Transactions on Wireless Communications, vol. 3, No. 5, Sep. 200.

* cited by examiner

HIGHLY UTILIZED COMMUNICATION CHANNEL WITH ORDER AND RETRANSMISSIONS

CROSS-REFERENCE TO RELATED APPLICATIONS

This application is a continuation-in-part of application Ser. No. 11/703,080, filed on Feb. 7, 2007, incorporated herein by reference.

TECHNICAL FIELD

Some of the disclosed embodiments relate to communication systems, and more particularly, to using a communication link to its maximum bandwidth.

BACKGROUND

Various error detection and correction techniques exist for assisting with correct communication over a wired, an optical, and/or a wireless communication link. For example, Forward Error Correction (FEC) encodes information prior to transmission in such a way that any errors occurring during communication may be identified and corrected upon reception. Automatic Repeat Request (ARQ) retransmits information that is deemed to have been erroneously received or not received at all. ARQ may either retransmit only a portion of the information, transmit appropriate FEC information, or any combination thereof. An explicit request for retransmission may be transmitted by a receiver to the transmitter upon detecting a communication fault. However, both techniques are most effective when the quality of the link is quite predictable. Untuned FEC may result in an unnecessary waste of bandwidth, and misused ARQ may result in a delay in the data communication.

Some known methods for transmitting data over a wireless digital communication link between a transmitting station and a receiving station include the steps of transmitting a first packet using a modulation scheme; monitoring if the transmitted packet has been correctly received; and transmitting, using a lower modulation scheme, a second packet associated with the first packet if the monitoring did not indicate correct reception. However, these techniques do not utilize the communication link to its maximum capability, and/or do not maintain the order of the packets, and/or do not feature fixed latency.

BRIEF SUMMARY

In one embodiment, a communication link comprising: a first transceiver configured to transmit a first set of packets at a predetermined rate with a first error resistance level, store the transmitted data in a buffer, receive a retransmission request, and retransmit the relevant data using one or more packets encoded with a second error resistance level that is higher than the first error resistance level; and a second transceiver configured to receive the first set of packets, detect an erroneous packet, request retransmission of the erroneous packet, and forward the data received in the packets according to its original order approximately after a fixed delay. Optionally, most of the packets comprise packet headers featuring a higher error resistance level than the packet payloads. Optionally, the average throughput and maximum burst of the retransmissions are controlled. Optionally, the first transceiver controls the retransmissions. Optionally, the second transceiver controls the retransmissions. Optionally, the maximum amount of retransmitted packets is determined so as not to interfere with the proper transmission of the first set of packets. Optionally, the maximal throughput of the transmissions of the first set of packets and the retransmitted packets approaches the maximum capacity of the communication link. Optionally, the retransmitted packets are transmitted with a priority higher than the priority of the first set of packets, whereby the higher priority reduces the latency of the communication link. Optionally, the communication is over a wired medium. Optionally, the communication is over a wireless medium. Optionally, the communication is over an optical medium. Optionally, the communication link is coupled to an end device that does not support retransmission. Optionally, the received data is forwarded after an approximately fixed delay with extremely low variance. Optionally, the fixed delay is in the order of the round trip delay. Optionally, the communication link carries a first and a second stream; at least some of the packets of the first stream are to be protected by retransmissions, and the packets of the second stream are not to be protected by retransmissions. Optionally, a network comprising at least three of the above described communication links ensures an approximately fixed latency with extremely low latency variance. Optionally, the network operates well with end devices that do not support retransmission.

In one embodiment, a receiver comprising: a packet buffer configured to store received packets; a packet processing element coupled to the packet buffer and configured to detect erroneous packets and send a retransmission request upon detection of an erroneous packet, wherein the retransmitted packet features a higher error resistance than the initial packet; the packet buffer is further configured to store at least one additional packet before storing the retransmitted packet; and the packet processing element is further configured to maintain the original order of the packets by inserting the retransmitted packet to its proper location. Optionally, most of the packets comprise packet headers featuring a higher error resistance than the packet payloads. Optionally, most of the packet headers are encoded using a lower modulation scheme than the modulation scheme used to encode their corresponding packet payloads. Optionally, the erroneous packets include missing packets. Optionally, the missing packets are identified using a packet identification code that is assigned according to a predefined series of codes; whereby the packet processing element identifies the missing packets by comparing the packet identification codes of the received packets with the expected packet identification codes of the series. Optionally, the receiver is configured to operate at a throughput close to its maximum possible throughput. Optionally, some of the received packets are to be protected by retransmission requests and some of the received packets are not to be protected by retransmission requests. Optionally, the packets comprise a field used to mark whether the packet is to be protected by retransmission, and in most of the packets the field features a higher error resistance than the packet payload. Optionally, the receiver receives packets belonging to a first and second streams; at least some of the packets of the first stream are to be protected by retransmissions, and the packets of the second stream are not to be protected by retransmissions. Optionally, a system comprising the above described receiver is configured to transmit the packets to the receiver over a communication link; wherein most of the packets carry time-sensitive data, and the system ensures approximately fixed latency with extremely low latency variance. Optionally, a network comprising receivers and transmitters as described above ensures approximately fixed latency with extremely low latency variance. Optionally, the network operates well with end devices that do not support retransmission.

In one embodiment, a network switch comprising multiple transceivers supporting packet retransmissions with a higher error resistance than the initial transmitted packet; the retransmissions are initiated by the receiver side; wherein a network comprising at least two links and at least one said switch maintains the original order of the packets and features a short and approximately fixed latency with extremely low latency variance. Optionally, most of the packets comprise packet headers featuring a higher error resistance than the packet payloads. Optionally, the average throughput and maximum burst of the retransmissions are controlled. Optionally, the network carries one or more main streams, and the maximum amount of retransmitted packets is determined so as not to interfere with the proper transmission of the main streams. Optionally, the retransmitted packets are transmitted with a priority higher than the priority of most of the initial transmitted packets, whereby the higher priority mechanism reduces the network's latency. Optionally, the network carries a first and a second stream; at least some of the packets of the first stream are to be protected by retransmissions, and the packets of the second stream are not to be protected by retransmissions. Optionally, the network is configured to operate at a throughput close to its maximum possible throughput.

In one embodiment, a method for operating a communication link close to its maximum capacity while maintaining the original order of transmitted data, comprising: transmitting at least one stream of data at a predetermined rate, the transmitted data featuring a first error resistance level; storing the received data in a buffer; requesting data retransmission upon detection of an error; retransmitting the data with a second error resistance level that is higher than the first error resistance level; and inserting the retransmitted data into the proper location in the buffer so as to maintain the original order of the data. Optionally, the method is operated over each hop of a network that maintains the original order of the data and features a short and approximately fixed latency with extremely low latency variance. Optionally, the data is transmitted using packets and most of the packets comprise packet headers featuring a higher error resistance than the packet payloads. Optionally, the method further comprising modulating most of the packet headers using a lower modulation than the modulation used to modulate the corresponding packet payloads. Optionally, the detected error includes a missing packet error, and further comprising identifying the missing packet using a packet identification code that is assigned according to a predefined series of codes. Optionally, the method further comprising transmitting another stream for which no retransmissions are requested. Optionally, the method further comprising marking which of the packets is to be protected by a retransmission and which is not. Optionally, the stream comprises time-sensitive data, and the method ensures approximately fixed latency with extremely low latency variance. Optionally, the method further comprising receiving the at least one stream of data at the predetermined rate with the first error resistance level from an end device that does not support retransmission.

Implementations of the disclosed embodiments involve performing or completing selected tasks or steps manually, semi-automatically, fully automatically, and/or a combination thereof. Moreover, depending upon actual instrumentation and/or equipment used for implementing the disclosed embodiments, several embodiments could be achieved by hardware, by software, by firmware, or a combination thereof. In particular, regarding hardware, different embodiments of the invention could be achieved by variations in the physical structure. Additionally, or alternatively, regarding software, selected functions of the invention could be performed by a data processor, such as a computing platform, executing software instructions or protocols using any suitable computer operating system.

BRIEF DESCRIPTION OF THE DRAWINGS

The embodiments are herein described, by way of example only, with reference to the accompanying drawings. No attempt is made to show structural details of the embodiments in more detail than is necessary for a fundamental understanding of the embodiments. In the drawings.

DETAILED DESCRIPTION

In the following description, numerous specific details are set forth. However, the embodiments of the invention may be practiced without some of these specific details. In other instances, well-known hardware, software, materials, structures and techniques have not been shown in detail in order not to obscure the understanding of this description. In this description, references to "one embodiment" or "an embodiment" mean that the feature being referred to may be included in at least one embodiment of the invention. Moreover, separate references to "one embodiment" in this description do not necessarily refer to the same embodiment. Illustrated embodiments are not mutually exclusive, unless so stated and except as will be readily apparent to those of ordinary skill in the art. Thus, the invention may include any variety of combinations and/or integrations of the embodiments described herein. Also herein, flow diagrams illustrate non-limiting embodiment examples of the methods, and block diagrams illustrate non-limiting embodiment examples of the devices. Some operations in the flow diagrams may be described with reference to the embodiments illustrated by the block diagrams. However, the methods of the flow diagrams could be performed by embodiments of the invention other than those discussed with reference to the block diagrams, and embodiments discussed with reference to the block diagrams could perform operations different from those discussed with reference to the flow diagrams. Moreover, although the flow diagrams may depict serial operations, certain embodiments could perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed. Furthermore, methods and mechanisms of the embodiments will sometimes be described in singular form for clarity. However, it should be noted that some embodiments may include multiple iterations of a method or multiple instantiations of a mechanism unless noted otherwise. For example, when a controller or an interface are disclosed in an embodiment, the scope of the embodiment is intended to also cover the use of multiple controllers or interfaces.

Figure 1A:
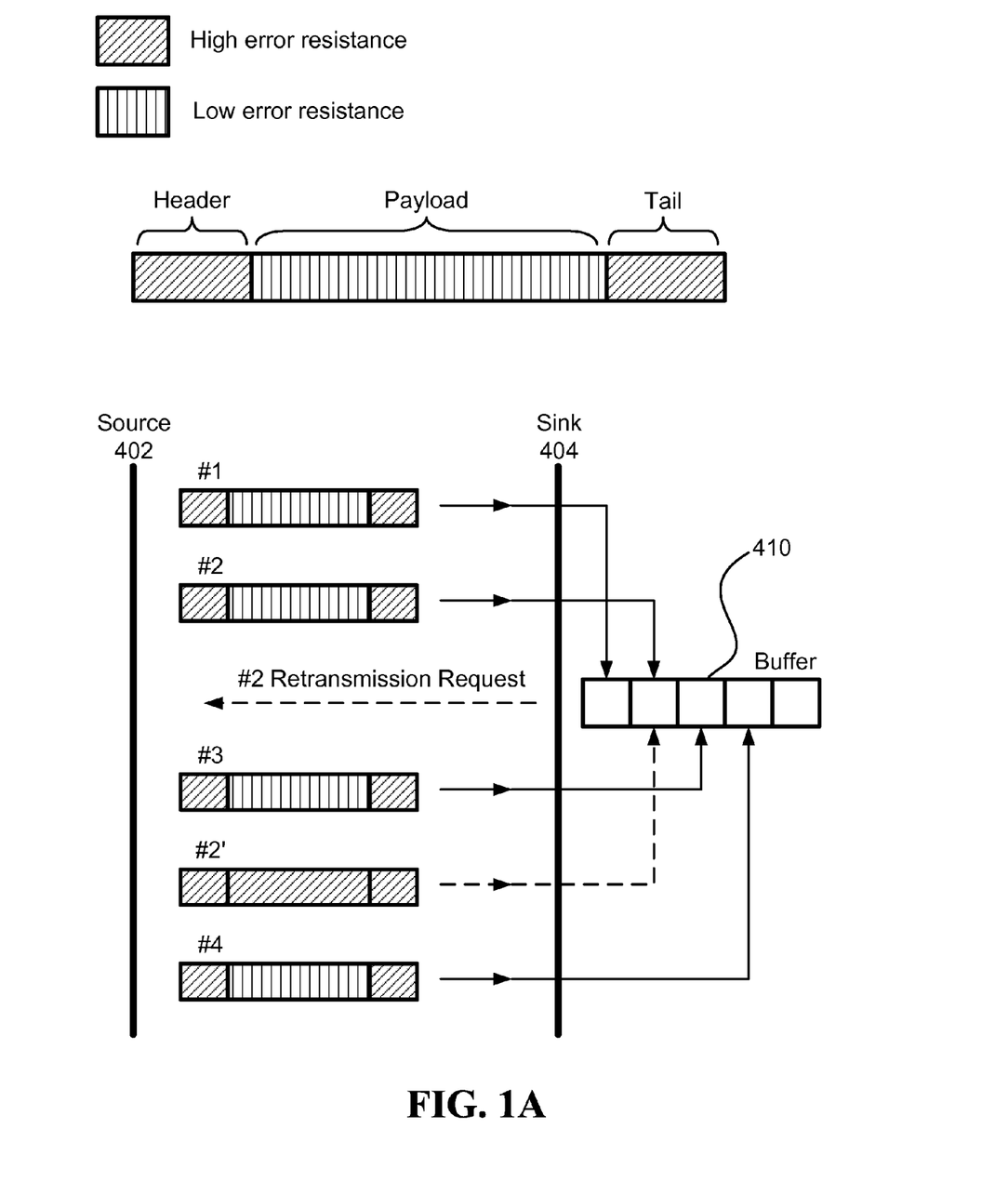
FIG. 1A illustrates one embodiment of retransmitting a packet whose header and tail feature a higher error resistance than its payload.

FIG. 1A illustrates one embodiment of retransmitting a packet whose header and tail feature a higher error resistance than its payload. Certain types of packets (#1, #2, #3, #4) of a first transmission are encoded to have a packet error rate much worse than the target packet error rate, while the retransmitted packets are encoded such that their packet error rate is approximately equal to or better than the target packet error rate. The source 402 sends packets to sink 404 at a predetermined rate. The source 402 stores the data transmitted through the packets for a period of time approximately equal to or longer than the round trip delay. The sink 404 receives the packets, checks the received packets for errors and/or missing packets, and requests retransmission of the erroneous packets (where erroneous packets also include the missing packets). Meanwhile, the source 402 continues to send packets at the predetermined rate, and sends the next packet(s) (in this example, packet #3), until the retransmission of the erroneous packets (in this example, packet #2). The payload of the retransmitted packet #2' is encoded using error resistance higher than the error resistance of packet #2, in order to ensure that no additional retransmissions will be required. After sending packet #2' to replace the erroneous packet #2, the source 402 sends the next unsent packet #4 according to the original order. On the receiving side, the sink 404 maintains the original order of the data by replacing the payload of the erroneous packet #2 in buffer 410 with the payload of the retransmitted packet #2'.

Different sections of the packet may feature different error resistances as a result of implementing different encoding schemes, as illustrated, for example, by FIG. 4A to FIG. 4D and as discussed in US patent application publication No. US20080187028, which is incorporated herein by reference. Alternatively, different sections of the packet may feature different error resistances as a result of implementing Forward Error Correction (FEC) techniques.

In one example, the communication link illustrated in FIG. 1A is used to transmit HDMI signals. In order to exploit the link to its maximum extent, the first set of packets delivers the HDMI data with a packet error rate of 1e-3 and CRC-32, and the retransmitted packets are delivered with a packet error rate of 1e-11, which is better than the packet error rate of 1e-9 required by the HDMI standard.

Figure 1B:
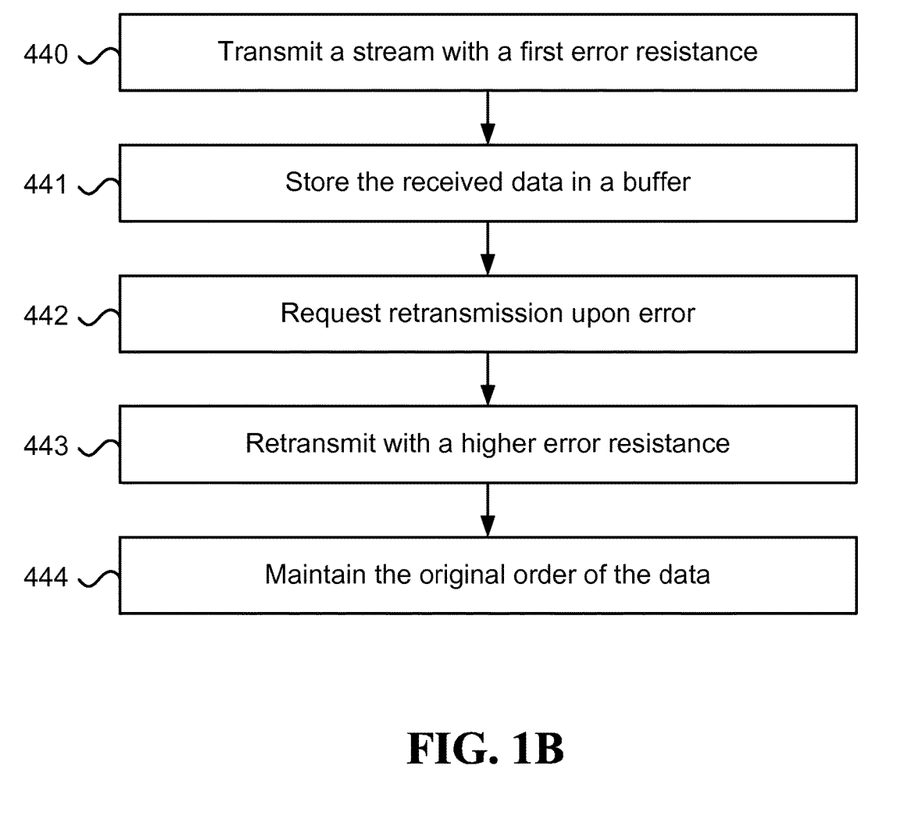
FIG. 1B is a flow diagram illustrating one method for operating a communication link close to its maximum capacity while maintaining the original order of transmitted data.

FIG. 1B is a flow diagram illustrating one method for operating a communication link close to its maximum capacity while maintaining the original order of transmitted data. The method comprising the following steps: In step 440 transmitting at least one stream of data at a predetermined rate; the transmitted data featuring a first error resistance level. In step 441, storing the received data in a buffer. In step 442, requesting data retransmission upon detection of an error. In step 443, retransmitting the data with a second error resistance level that is higher than the first error resistance level. And in step 444, inserting the retransmitted data into the proper location in the buffer so as to maintain the original order of the data. In one embodiment, the method is operated over each hop of a network that maintains the original order of the data and features a short and approximately fixed latency with extremely low latency variance. In one embodiment, the detected error includes a missing packet error, and further comprising identifying the missing packet using a packet identification code that is assigned according to a predefined series of codes. In one embodiment, the stream comprises time-sensitive data, and the method ensures approximately fixed latency with extremely low latency variance.

Figure 2:
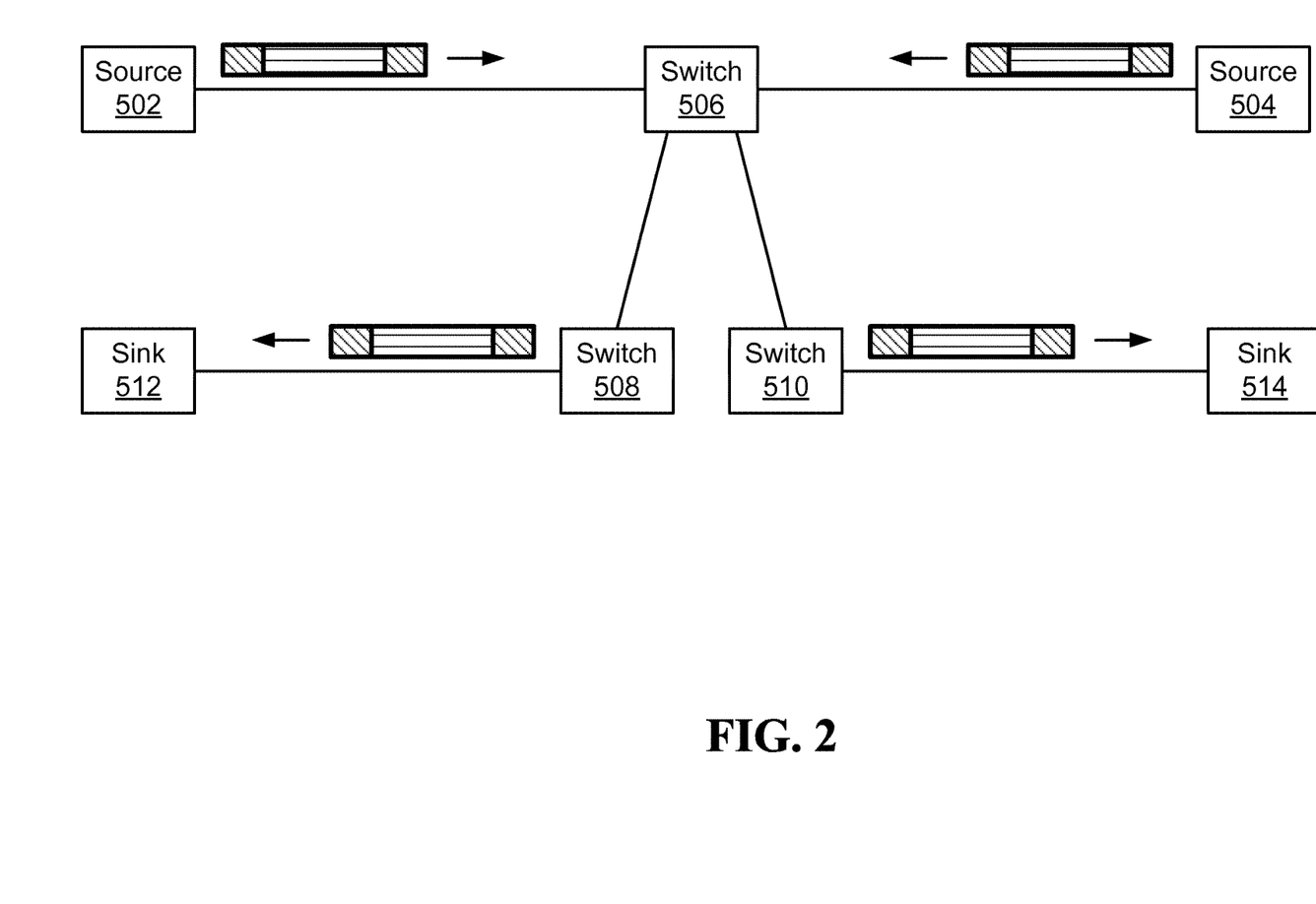
FIG. 2 illustrates a network that implements the embodiments over each hop.

FIG. 2 illustrates a network that implements the method illustrated by FIG. 1A over each hop. Thus, the entire network maintains the order of the transmitted packets, and requests for retransmissions are responded to using packets with improved error resistance and, for the most part, without adversely affecting the original streams transmitted from the sources 502 and 504. Optionally, the sources 502 and 504 transmit the original streams approximately according to a fixed transmission rate. Optionally, the network approximately ensures a fixed latency with extremely low latency variance. Optionally, the sources 502 and 504 receive the data from end devices that do not support retransmission.

In one embodiment, the switches 506, 508, and 510 of the network illustrated in FIG. 2 comprise buffers and therefore the network can operate well with legacy end devices 502, 504, 512, and 514 that do not support retransmission. In this embodiment the total latency of the network may also be reduced when retransmission is not required over at least one of the hops.

Figure 3:
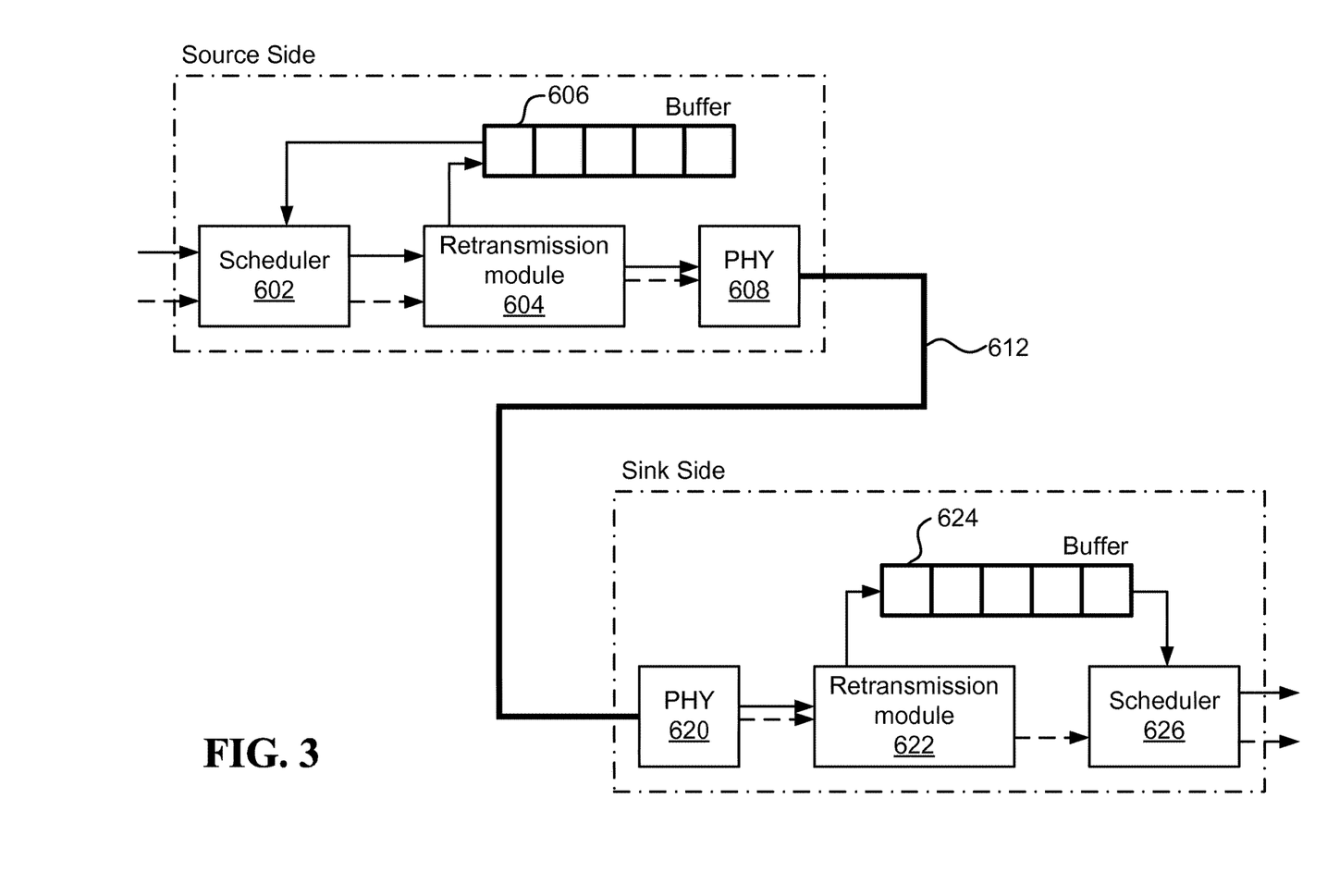
FIG. 3 illustrates one embodiment of source and sink devices supporting retransmissions and fixed delay for at least some of the streams.
Figure 4A:
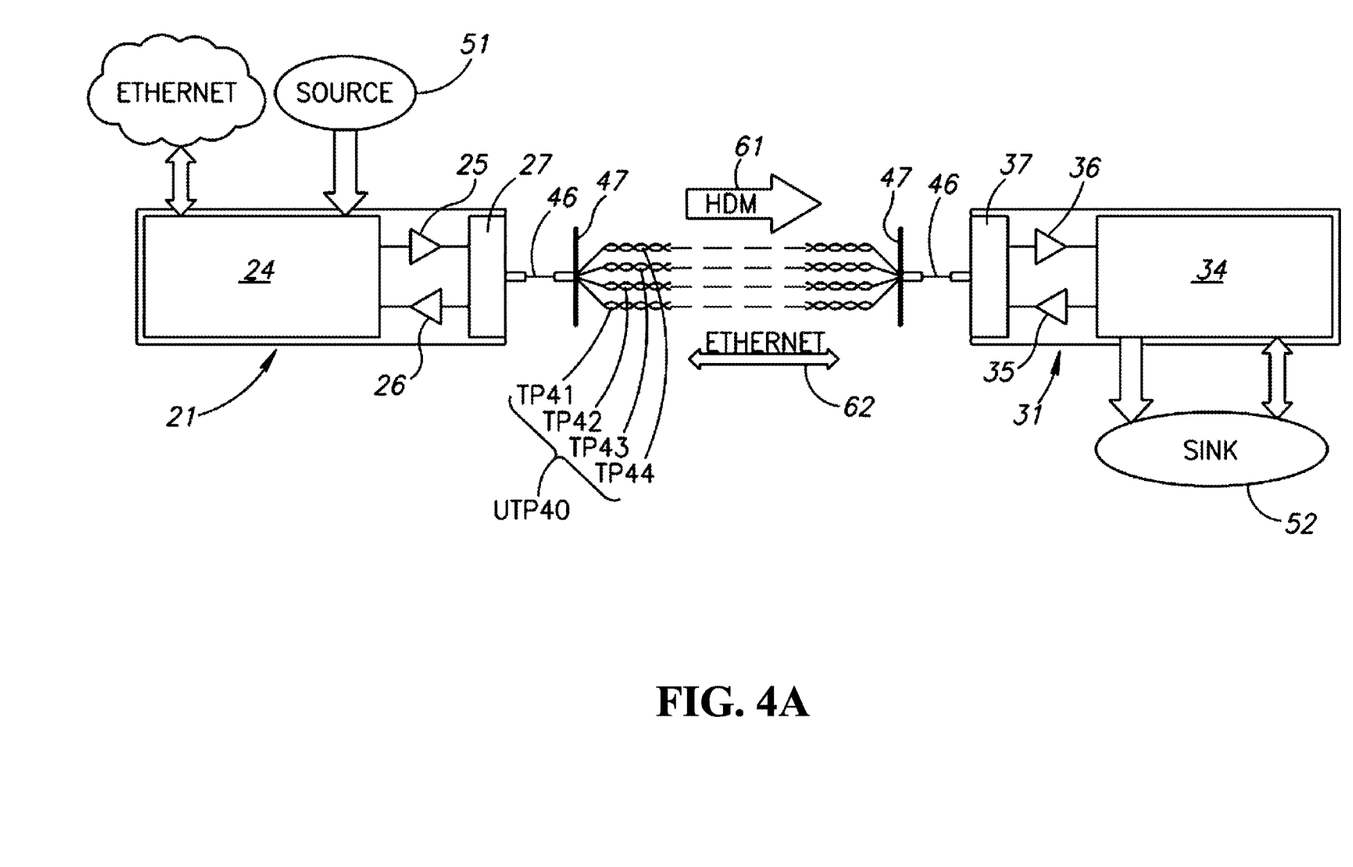
FIG. 4A to FIG. 4D illustrate different sections of a packet featuring different error resistances as a result of implementing different encoding schemes.
Figure 4B:
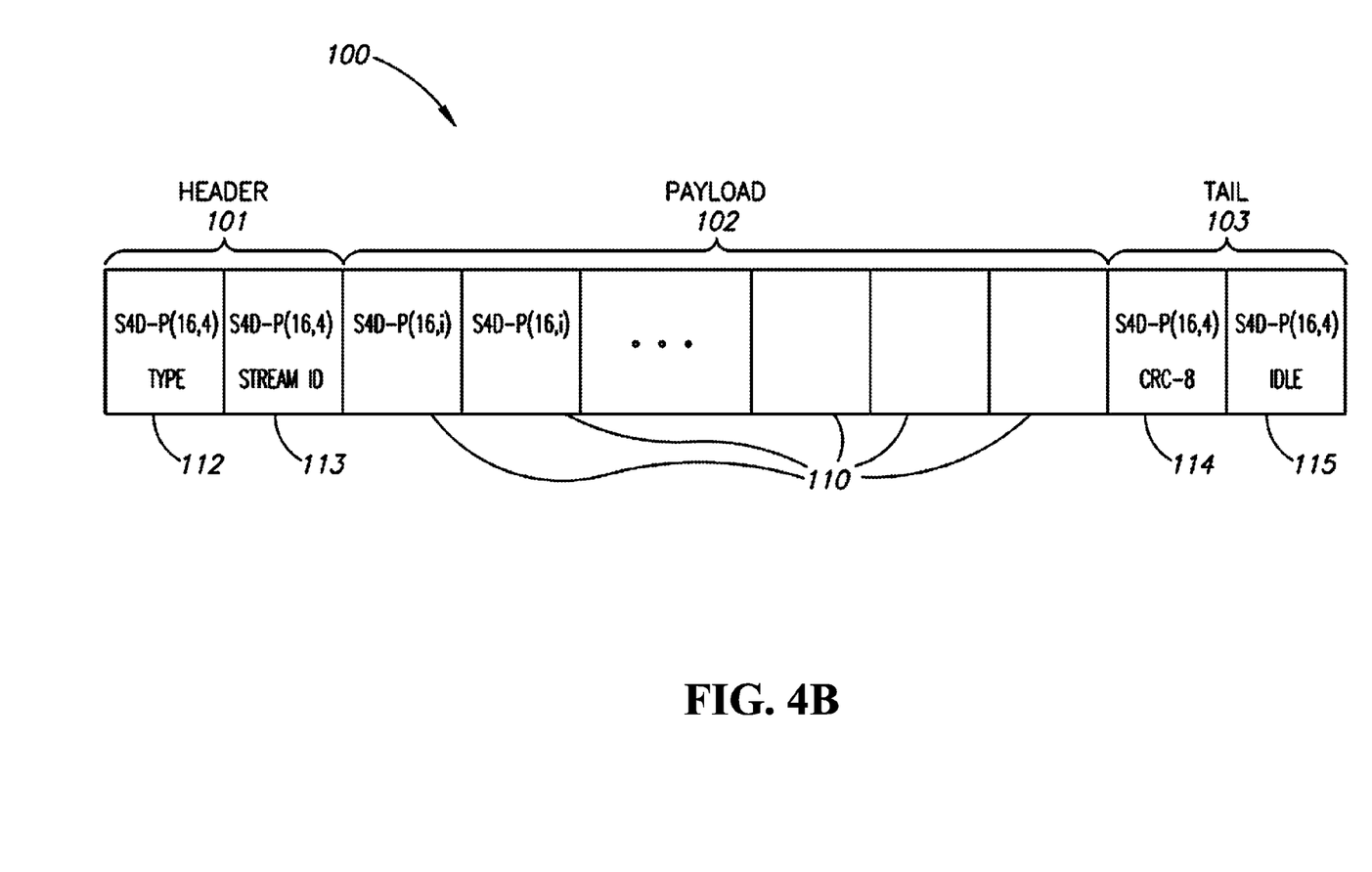
Figure 4C:
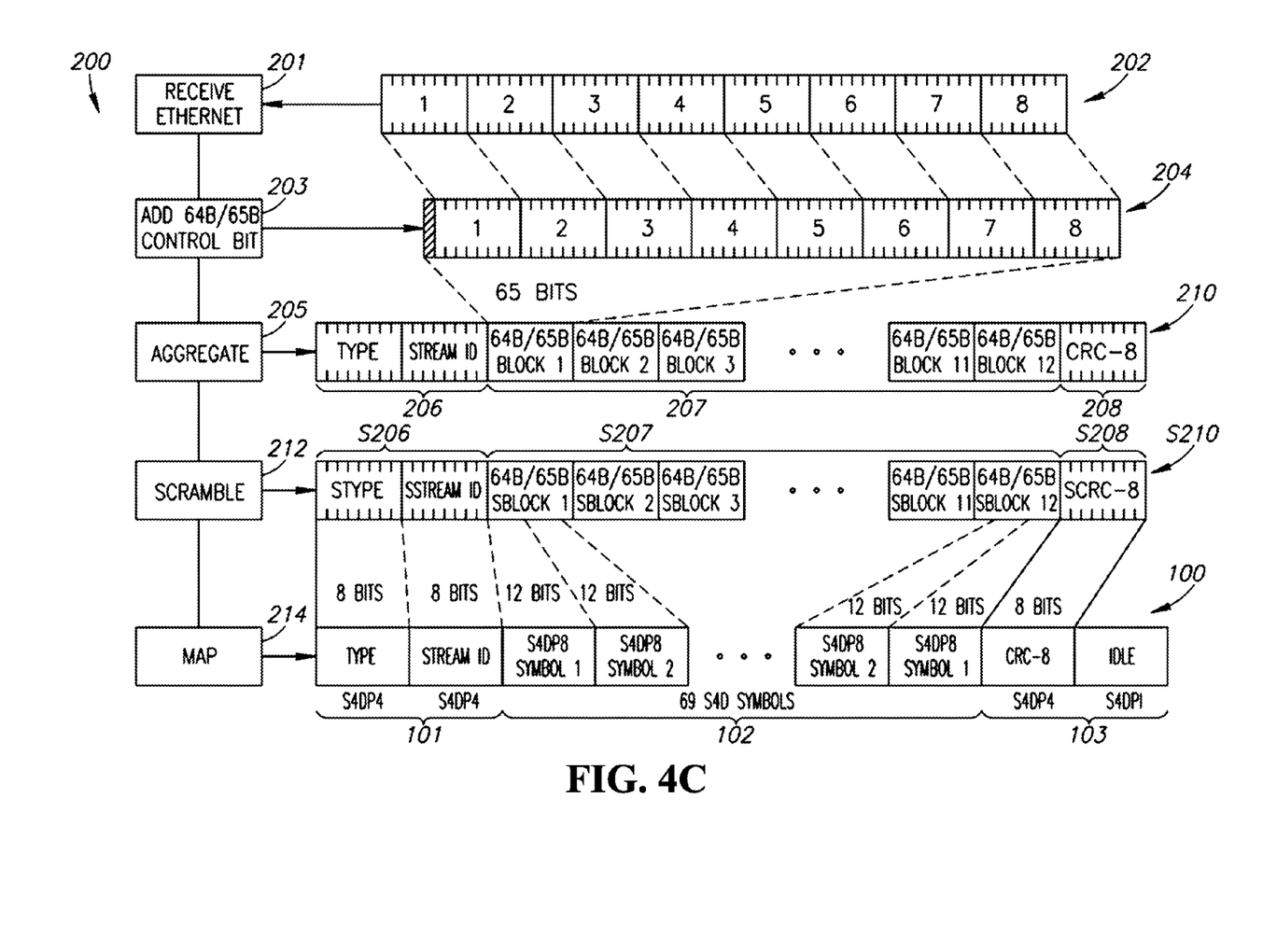
Figure 4D:
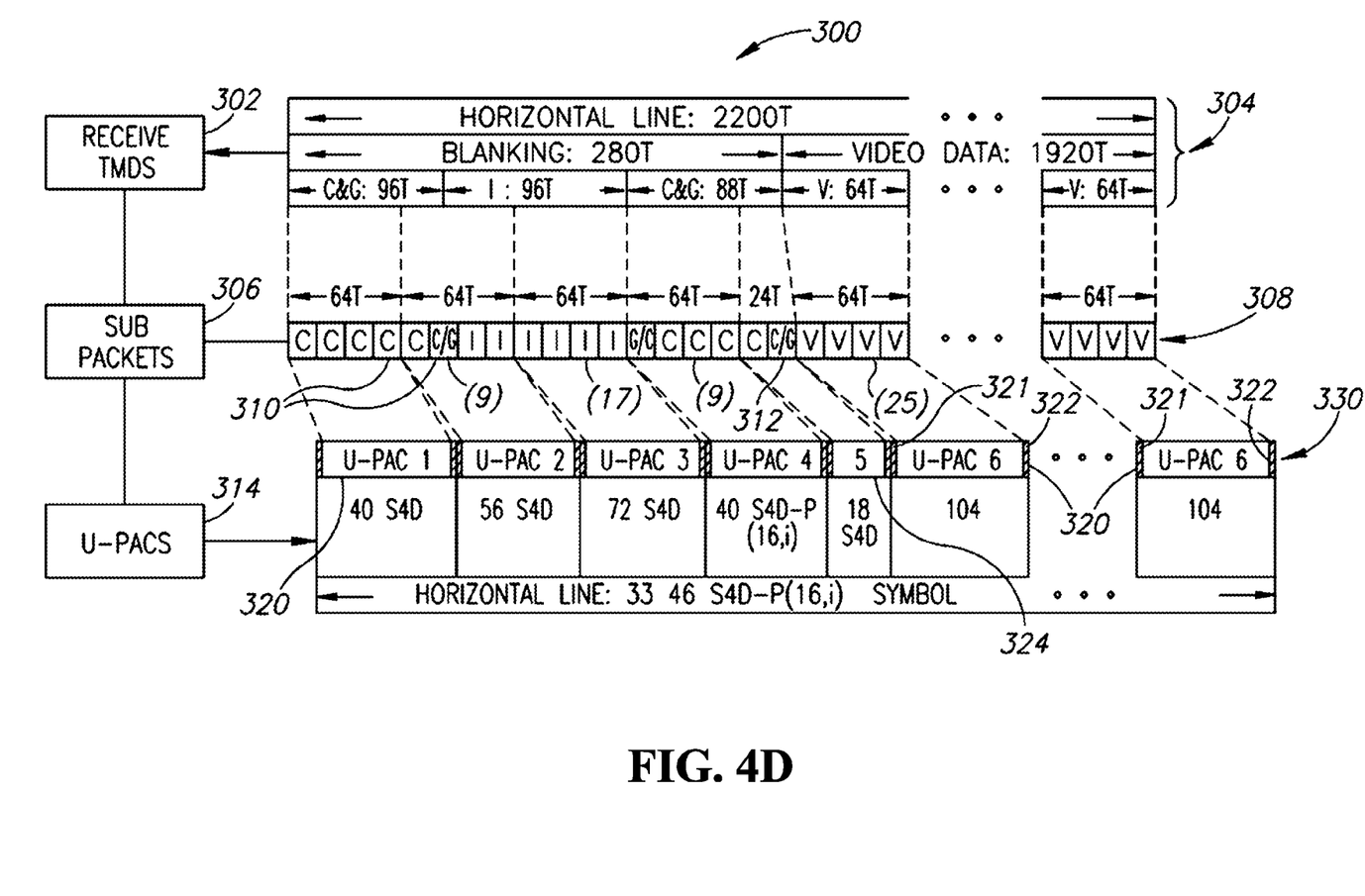

FIG. 3 illustrates one embodiment of source and sink devices supporting retransmissions and fixed delay for at least some of the streams. On the source side, the source's scheduler 602 receives a first stream to be protected by the retransmission mechanism (marked by a solid line) and a second stream that is not to be protected by the retransmission mechanism (marked by a dashed line). The source's retransmission module 604 optionally adds additional packet identification data to the first stream packets in order to identify their sequential order, and then stores a section of the first stream in the source's buffer 606. The first and second streams are transmitted by the source's physical layer component 608 over the link 612, and are received on the sink side by the receiver's physical layer component 620. The receiver's retransmission module 622 forwards the packets of the second stream to the receiver's scheduler 626, with or without a CRC check, and forwards the packets of the first stream to the receiver's buffer 624. Upon detection of a CRC error in a first stream packet, or detection of a missing packet, optionally based on a gap in the additional packet identification data, the receiver's retransmission module 622 sends a proper retransmission request to the source. The source's retransmission module 604 extracts the required packet from the source's buffer 606, re-encodes the packet to feature a better error resistance, and sends the retransmitted packet to the sink. In order to maintain the original order of the packets, the receiver uses the receiver's buffer 624 to introduce latency on all protected packets, proper or erroneous, and the receiver's retransmission module 622 inserts the retransmitted packet into its original position in the receiver's buffer 624. After the required latency period passes, the packets from the receiver's buffer 624 are forwarded to the receiver's scheduler 626.

In one embodiment, the communication link illustrated in FIG. 3 carries multimedia signals. The video pixel data is protected by retransmissions, while latency sensitive data that does not have to be synchronized to the video pixel data is transmitted over the second stream that is not to be protected by the retransmission mechanism, and therefore without the fixed delay. In this case, neither the transmitter, nor the receiver needs to store the unprotected packets in the retransmission buffer. In one embodiment, the retransmission protection mechanism is not required because the unprotected data types are transmitted using a much higher error resistance level, such as lower PAM, than the initial protected packets. For example, link control messages and video DDC signals and may be transmitted with a high error resistance and without the retransmission mechanism.

In one embodiment, a first video stream is protected by the retransmission mechanism and a second video stream is not protected by the retransmission mechanism. Therefore, the unprotected video stream features a shorter link delay than the protected video stream. In one embodiment, the maximal link delay determines the maximum number of retransmissions, which determines the amount of traffic to be protected by the retransmission mechanism.

There are cases where it is necessary to utilize a communication channel approximately to its maximum capacity, while maintaining the order of the transmitted packets and a fixed and short latency. In order to utilize the communication channel approximately to its maximum capability, the data cannot be protected only by Forward Error Correction (FEC) code, which consumes extra bandwidth when the interference over the communication link cannot be accurately predicted. Therefore, erroneous packets that cannot be corrected by the optional FEC code have to be retransmitted. And in order to maintain the order of the transmitted packets and a fixed and short latency, the retransmitted packets should be requested as soon as the receiver identifies an error in a received packet, and/or identifies a missing packet.

In one embodiment, a communication link comprising a first and second transceivers. The first transceiver transmits a first set of packets at a predetermined rate with a first error resistance level and stores the transmitted data in a buffer. The second transceiver receives the first set of packets, checks the packets for errors, and upon detecting an erroneous packet, requesting retransmission of the erroneous packet. The first transceiver receives the retransmission request and retransmits the relevant data using one or more packets encoded with a second error resistance level that is higher than the first error resistance level. Then the second transceiver forwards the data received in the packets according to its original order approximately after a fixed delay. In one embodiment, the average throughput and maximum burst of the retransmissions are controlled such as not to over a predefined amount, not to overload the link, not to interfere with the proper transmission of the first set of packets, To bring the maximal throughput of the transmissions of the first set of packets and the retransmitted packets to the maximum capacity of the communication link, and/or not to increase the delay above a certain value. The retransmissions may be controlled by first transceiver, the second transceiver, and/or any other appropriate element. In one embodiment, the retransmitted packets are transmitted with a priority higher than the priority of the first set of packets. Retransmitting the packets with a higher priority may reduce the latency of the communication link by shortening the time between requesting a retransmission and receiving the retransmitted packet. The embodiments may be implemented over a variety of mediums, such as a wired medium, a wireless medium, or an optical medium. Moreover, the embodiments may be used to create a network that ensures an approximately fixed latency with extremely low latency variance. Such a network may also operate well with end devices that do not support retransmission.

In one embodiment, a receiver comprising a packet buffer coupled to a packet processing element. The packet buffer stores the received packets and the packet processing element detects erroneous packets and sends a retransmission request upon detection of an erroneous packet. Optionally, the packets include a packet identification code that is assigned according to a predefined series of codes and the packet processing element identifies the missing packets by comparing the packet identification codes of the received packets with the expected packet identification codes of the series. When receiving the retransmitted packet, the packet processing element maintains the original order of the packets by inserting the retransmitted packet to its proper location.

In one embodiment, a network switch includes multiple transceivers supporting packet retransmissions with a higher error resistance than the initial transmitted packet. The retransmissions are initiated by the receiver side and a network comprising at least two links and at least one said switch maintains the original order of the packets and features a short and approximately fixed latency with extremely low latency variance. In one embodiment, the network carries one or more main streams, and the maximum amount of retransmitted packets is determined so as not to interfere with the proper transmission of the main streams. In one embodiment, the network's latency is reduced by retransmitting the packets with a priority higher than the priority of most of the initial transmitted packets.

Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination.

The embodiments are not limited in their applications to the details of the order or sequence of steps of operation of methods, or to details of implementation of devices, set in the description, drawings, or examples.

While the methods disclosed herein have been described and shown with reference to particular steps performed in a particular order, it will be understood that these steps may be combined, sub-divided, or reordered to form an equivalent method without departing from the teachings of the embodiments. Accordingly, unless specifically indicated herein, the order and grouping of the steps is not a limitation of the embodiments.

While the embodiments have been described in conjunction with specific examples thereof, it is to be understood that they have been presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents.

What is claimed is:

1. A network comprising at least two wired communication links, comprising:
   a first transceiver configured to: transmit packets comprising payloads with a first error resistance level to a second transceiver over a first wired communication link, store the payloads in a first buffer, receive a first retransmission request for a first payload that is included in the payloads, and retransmit the first payload using a first retransmission packet encoded with a second error resistance level that is higher than the first error resistance level, resulting in no additional retransmissions being required to transmit the first payload successfully;

the second transceiver is configured to: receive the packets from the first transceiver, transmit non-retransmitted packets after a fixed delay with the first error resistance level to a third transceiver over a second wired communication link, store the payloads in a second buffer, receive a second retransmission request for a second payload that is included in the payloads, and retransmit the second payload using a second retransmission packet encoded with the second error resistance level that is higher than the first error resistance level, resulting in no additional retransmissions being required to transmit the second payload successfully.

2. The network of claim 1, wherein most of the packets comprise packet headers featuring a higher error resistance level than error resistance level of the payloads.

3. The network of claim 1, wherein average throughput and maximum burst of the first and second retransmissions are controlled, and the packets are transmitted at a predetermined rate.

4. The network of claim 3, wherein maximal throughput of the transmissions of the packets and the first retransmission approaches maximum capacity of the first wired communication link.

5. The network of claim 3, wherein the first and second retransmission packets are transmitted with a priority higher than priority of the packets, whereby the higher priority reduces latency of the first and second wired communication links.

6. The network of claim 3, wherein the second wired communication link is coupled to an end device that does not support retransmission.

7. The network of claim 1, wherein the fixed delay is in order of round trip delay between the first transceiver and the second transceiver.

8. A network comprising at least two wired communication links, comprising:
a first transceiver comprising: a first packet buffer configured to store packets received over a first wired communication link, and a packet processing element coupled to the first packet buffer and configured to send a first retransmission request for a first retransmitted packet upon detection of a first erroneous packet, wherein the first retransmitted packet features a higher error resistance than the received packets, resulting in no additional retransmissions being required to transmit the first retransmitted packet successfully; the first packet buffer is further configured to store at least one additional packet before storing the first retransmitted packet; and the first packet processing element is further configured to maintain original order of the received packets by replacing the first erroneous packet with the first retransmitted packet; and
a second transceiver comprising: a second packet buffer configured to store packets received from the first transceiver over a second wired communication link after a fixed delay, and a second packet processing element coupled to the second packet buffer and configured to send a second retransmission request for a second retransmitted packet upon detection of a second erroneous packet, wherein the second retransmitted packet features a higher error resistance than received non-retransmitted packets, resulting in no additional retransmissions being required to transmit the second retransmitted packet successfully; the second packet buffer is further configured to store at least one additional packet before storing the second retransmitted packet; and the second packet processing element is further configured to maintain original order of the received packets by replacing the second erroneous packet with the second retransmitted packet.

9. The network of claim 8, wherein the first transceiver is configured to operate at a throughput close to its maximum possible throughput.

10. The network of claim 8, wherein some of the received packets are to be protected by retransmission requests and some of the received packets are not to be protected by retransmission requests.

11. The network of claim 10, wherein the received packets comprise a field used to mark whether the received packet is to be protected by retransmission, and in most of the received packets the field features a higher error resistance than the error resistance of payloads of the packets.

12. The network of claim 8, wherein the first transceiver receives packets belonging to a first stream and a second stream; at least some packets of the first stream are to be protected by retransmissions, and packets of the second stream are not to be protected by retransmissions.

13. The network of claim 8, wherein the network ensures low latency variance.

14. The network of claim 13, wherein the network is configured to operate with end devices that do not support retransmission.

15. A network of at least two links, comprising:
first, second, and third transceivers configured to transmit a set of packets, with a first error resistance level, over the at least two links;
the first transceiver is configured to transmit a first retransmitted packet with a second error resistance level, which is higher than the first error resistance level, resulting in no additional retransmissions being required to transmit the first retransmitted packet successfully;
the second transceiver is configured to request the first retransmitted packet and is configured to maintain original order of the set of packets over the at least two links by forwarding a first set of non-retransmitted packets to the third transceiver after a fixed delay; and
the third transceiver is configured to request a second retransmitted packet from the second transceiver and is configured to maintain original order of the set of packets over the at least two links by forwarding a second set of non-retransmitted packets to their destination after storing them for the fixed delay.

16. The network of claim 15, wherein most of the initial transmitted packets comprise packet headers featuring a higher error resistance than error resistance of payloads of the initial transmitted packets.

17. The network of claim 15, wherein average throughput and maximum burst of the retransmitted packets are controlled.

18. The network of claim 17, wherein the network carries one or more main streams, and a maximum amount of the retransmitted packets is determined so as not to interfere with proper transmission of the main streams.

19. The network of claim 17, wherein the retransmitted packets are transmitted with a priority higher than priority of most of the initial transmitted packets, whereby a higher priority mechanism reduces latency of the network.

20. The network of claim 15, wherein the network carries a first stream and a second stream; at least some packets of the first stream are to be protected by retransmissions, and packets of the second stream are not to be protected by retransmissions.

21. The network of claim 15, wherein the network is configured to operate at a throughput close to maximum possible throughput of the network.

22. A method for operating a communication link with a fixed latency, comprising:
   transmitting a stream of data at a predetermined rate; the stream of data comprises payloads featuring a first error resistance level;
   receiving the stream, and storing the payloads in a buffer;
   requesting a retransmission upon detection of an erroneous part of the payload;
   retransmitting the erroneous part of the payload with a second error resistance level that is higher than the first error resistance level, resulting in no additional retransmissions being required to transmit the erroneous part of the payload;
   inserting the retransmitted erroneous part of the payload into a proper location in the buffer so as to maintain original order of the payloads of the stream; and
   wherein the method is operated over each hop of a network that maintains the original order of the payload and features a fixed latency over each hop.

23. The method of claim 22, wherein the stream is transmitted using packets, and most of the packets comprise packet headers featuring a higher error resistance than error resistance of the payloads.

24. The method of claim 23, further comprising modulating most of the headers using a lower modulation than modulation used to modulate the payloads.

25. The method of claim 23, wherein the detected error includes a missing packet error, and further comprising identifying the missing packet using a packet identification code that is assigned according to a predefined series of codes.

26. The method of claim 23, further comprising transmitting another stream for which no retransmissions are requested.

27. The method of claim 23, further comprising marking which of the packets is to be protected by the retransmission and which is not.

28. The method of claim 23, wherein the stream of data comprises time-sensitive data, and ensuring fixed latency with low latency variance.

29. The method of claim 23, further comprising receiving the stream of data at the predetermined rate with the first error resistance level from an end device that does not support retransmission.

\* \* \* \* \*